United States Patent
Trizna (10) Patent No.: US 8,305,257 B2
(45) Date of Patent: Nov. 6, 2012

(54) METHOD AND APPARATUS FOR COHERENT MARINE RADAR MEASUREMENTS OF PROPERTIES OF OCEAN WAVES AND CURRENTS

(76) Inventor: Dennis B. Trizna, Burke, VA (US)

( * ) Notice: Subject to any disclaimer, the term of this patent is extended or adjusted under 35 U.S.C. 154(b) by 341 days.

(21) Appl. No.: 12/868,912

(22) Filed: Aug. 26, 2010

(65) Prior Publication Data

US 2010/0315284 A1 Dec. 16, 2010

Related U.S. Application Data (60) Provisional application No. 61/239,390, filed on Sep. 2, 2009.

(51) Int. Cl.
*G01S 13/95* (2006.01)
*G01S 13/08* (2006.01)
*G01S 13/00* (2006.01)

(52) U.S. Cl. ............ 342/123; 702/1; 702/2; 702/3; 342/26 R; 342/26 C; 342/118; 342/175; 342/192; 342/194; 342/195; 342/196

(58) Field of Classification Search ............ 702/1, 2, 702/3; 342/26 R–26 D, 104–115, 118, 123, 342/175, 176, 179, 190–197
See application file for complete search history.

(56) References Cited

U.S. PATENT DOCUMENTS

| | | | | |
|---|---|---|---|---|
| 3,567,915 A | * | 3/1971 | Altshuler et al. | 342/26 R |
| 3,725,914 A | * | 4/1973 | Davidson et al. | 342/26 D |
| 4,101,891 A | * | 7/1978 | Fletcher et al. | 342/26 A |
| 4,172,255 A | * | 10/1979 | Barrick et al. | 342/26 D |
| 4,356,487 A | * | 10/1982 | Herbreteau | 342/26 D |
| 4,509,048 A | * | 4/1985 | Jain | 342/25 R |
| 4,633,255 A | * | 12/1986 | Trizna | 342/192 |
| 4,933,678 A | * | 6/1990 | Tennyson | 342/176 |
| 4,996,533 A | * | 2/1991 | May et al. | 342/195 |

(Continued)

FOREIGN PATENT DOCUMENTS

DE 4302122 8/1994

(Continued)

OTHER PUBLICATIONS

D. Trizna and K. Hathaway, "Monitoring Coastal Processes and Ocean Wave Directional Spectra Using a Marine Radar", Ocean Sciences 2006, Honolulu, pp. 1-2, Feb. 20-24, 2006.

*Primary Examiner* — Bernarr Gregory
(74) *Attorney, Agent, or Firm* — Walter J. Tencza, Jr.

(57) ABSTRACT

A method and apparatus of determining a wave height directional spectrum of an ocean wave field using the intermediate-frequency (IF) signal from marine radars with a rotating antenna, using either a fully coherent or a standard non-coherent transmitter/receiver modified for coherent-on-receive use. The method may include receiving the IF radar ocean surface echo signal for a series of transmit pulses, at a sequence of azimuthal antenna positions, and a number of antenna rotations covering several minutes, then generating a matrix of complex IF signal samples from these, deriving phases for each sample, generating the difference in phase for consecutive azimuths, then Doppler shifts, and finally radial velocities. These are interpolated to a Cartesian-transformed representation cube of samples, a subset of which is Fourier transformed in three dimensions, filtered, and the resulting power spectrum generated is used to derive ocean wave height directional spectra, frequency spectra, and root-mean-squared wave height.

14 Claims, 8 Drawing Sheets

U.S. PATENT DOCUMENTS

| | | | |
|---|---|---|---|
| 5,469,168 A * | 11/1995 | Anderson | 342/26 D |
| 6,691,035 B1 * | 2/2004 | Kang | 702/3 |
| 6,774,837 B2 * | 8/2004 | Barrick et al. | 342/26 R |
| 6,775,617 B2 | 8/2004 | Seemann | |
| 7,145,503 B2 * | 12/2006 | Abramovich et al. | 342/26 D |
| 7,365,675 B2 * | 4/2008 | Pearlman et al. | 342/26 B |
| 7,728,759 B2 * | 6/2010 | Tillotson et al. | 342/26 A |
| 7,808,426 B1 * | 10/2010 | Smith, Jr. | 342/123 |
| 7,830,302 B1 * | 11/2010 | Smith, Jr. | 342/123 |
| 2003/0167125 A1 | 9/2003 | Seamann | |

FOREIGN PATENT DOCUMENTS

| | | |
|---|---|---|
| DE | 10035921 | 2/2002 |
| DE | 10035931 | 2/2002 |
| EP | 1542034 | 6/2005 |
| JP | 11237477 | 8/1999 |
| JP | 2003130951 | 5/2003 |
| WO | WO 0026693 | 5/2000 |
| WO | 0208691 | 1/2002 |

* cited by examiner

METHOD AND APPARATUS FOR COHERENT MARINE RADAR MEASUREMENTS OF PROPERTIES OF OCEAN WAVES AND CURRENTS

CROSS REFERENCE TO RELATED APPLICATIONS(S)

This application claims the priority of U.S. provisional patent application Ser. No. 61/239,390, filed on Sep. 2, 2009.

FIELD OF THE INVENTION

This invention relates to improved methods and apparatus concerning measuring properties of ocean waves and currents.

BACKGROUND OF THE INVENTION

Known marine radars offer the capability to image ocean wave propagation by virtue of repetitive coverage of the same scene. With a typical 1.25 second rotation period of a marine radar, ocean wave frequencies of 0.4 Hertz (Hz) can be measured unambiguously. Imaged areas of the order of ten square kilometers, allow the dynamics and kinematics of ocean wave fields to be measured by marine radars with higher azimuthal resolution than traditional oceanographic instruments, such as buoys or pressure sensors.

Using the dispersion relation for shallow waves in coastal regions, ocean wave spectra and bathymetry can be estimated using known non-coherent marine radars. The derivation of ocean wave height or ocean wave height spectra from marine radar imagery has had some success by relating the radar echo intensity imagery of waves to wave height using an empirically derived modulation transfer function (MTF) to scale echo intensity to wave height, as shown by U.S. Pat. No. 6,775,617, to Seemann, incorporated herein by reference. However, in coastal waters in general, or in deep waters when wind direction shifts rapidly, winds blowing in a direction other than parallel to that of the wave field can produce enhanced roughness on the front face of waves. This results in a modulation of the radar wave field image that is not wave height dependent and can create errors in wave height measurement, such as disclosed by D. Trizna and K. Hathaway, "Monitoring Coastal Processes and Ocean Wave Directional Spectra Using a Marine Radar", Ocean Sciences 2006, Honolulu, pp. 1-2, 20-24 Feb. 2006.

SUMMARY OF THE INVENTION

The present invention in one or more embodiments provides a coherent radar that overcomes limitations or previous radar by using a computer processor to use the direct measurement of the radial component of orbital ocean wave velocity, accounting for Bragg scatter velocity. Radial orbital velocity will maximize and minimize at similar locations on long wave profiles as do radar echo intensity, so wave patterns should look very similar for the two. Thus, analysis methods similar to those used in non-coherent radar studies should be applicable to coherent radar data as well. In one or more embodiments, wave height is derived directly from orbital wave velocity measurement, whereas previous methods derived wave height from an empirical relation between radar echo intensity and wave slope, which can vary with environmental conditions.

In at least one embodiment of the present invention a method of determining a plurality of wave heights of an ocean wave field is provided. The method may be comprised of receiving a first real intermediate frequency (IF) radar echo signal, at a first azimuthal radar antenna position, comprised of a plurality of samples, at a marine radar device, as a result of a radar transmit signal first pulse interacting with the ocean wave field. The method may further include generating a first complex intermediate frequency signal from the first real intermediate (IF) radar echo signal. The first complex intermediate frequency signal may be comprised of a plurality of samples, and wherein each sample of the plurality of samples of the first complex intermediate frequency signal has a real part $I_j$ and an imaginary part $Q_j$, wherein j indicates a number of a sample of the plurality of samples of the first complex intermediate frequency signal. Each sample of the plurality of samples of the first complex intermediate frequency signal may correspond to a range delay, such that there are a plurality of range delays for a corresponding plurality of samples of the first complex intermediate frequency signal.

The method may further include using a computer processor to determine the phase of each sample of the first complex intermediate frequency signal by taking the arc tangent of the ratio of $I_j/Q_j$, so that a first plurality of phases are determined for the corresponding plurality of samples of the first complex intermediate frequency signal, and storing the first plurality of phases for the first complex intermediate frequency signal in computer memory.

The method may also include receiving a second real intermediate frequency (IF) radar echo signal, at a second azimuthal radar antenna position, comprised of a plurality of samples, at the marine radar device, as a result of a radar transmit signal second pulse interacting with the ocean wave field; and generating a second complex intermediate frequency signal from the second real intermediate (IF) radar echo signal. The second complex intermediate frequency signal may be comprised of a plurality of samples, wherein each sample of the plurality of samples of the second complex intermediate frequency signal has a real part $I_k$ and an imaginary part $Q_k$, wherein k indicates a number of a sample of the plurality of samples of the second complex intermediate frequency signal. Each sample of the plurality of samples of the second complex intermediate frequency signal may correspond to a range delay of the plurality of range delays.

The method may also include using a computer processor to determine the phase of each sample of the second complex intermediate frequency signal by taking the arc tangent of the ratio of $I_k/Q_k$, so that a second plurality of phases are determined for the corresponding plurality of samples of the second complex intermediate frequency signal; and storing the second plurality of phases for the second complex intermediate frequency signal in computer memory.

The method may further include using a computer processor to determine the difference between each phase of the first plurality of phases and each phase of the second plurality of phases for a corresponding range delay of the plurality of range delays to determine a plurality of phase differences for the corresponding plurality of range delays; and storing the plurality of phase differences in computer memory.

The method may further include using a computer processor to transform each of the plurality of phase differences in radians to a Doppler shift of each range delay of the plurality of range delays by dividing each of the plurality of phase differences by a time period between the radar transmit signal first pulse and the radar transmit signal second pulse, so that a plurality of Doppler Shifts are formed one for each range delay of the plurality of range delays; wherein the radar transmit signal first pulse and the radar transmit signal second pulse are part of a radar transmit signal having a wavelength.

The method may further include using a computer processor to determine a first sequence of a plurality of radial velocity measurements of the ocean wave field from the plurality of Doppler shifts by multiplying each of the plurality of Doppler shifts by one half the wavelength of the first radar transmit signal.

The steps of generating the first complex intermediate frequency signal and generating the second complex intermediate frequency signal may each include using a microwave quadrature coupler hardware device.

The step of generating the first complex intermediate frequency signal may include using a computer processor implementing a computer software program to generate the first complex intermediate frequency, $(I,Q)^1$ signal by applying the Hilbert Transform to the first real intermediate frequency (IF) radar echo signal; and the step of generating the second complex intermediate frequency signal includes using a computer processor implementing a computer software program to generate the second complex intermediate frequency signal, $(I,Q)^2$, by applying the Hilbert Transform to the second real intermediate frequency (IF) radar echo signal.

The method may further include repeating the steps of claim 1 for a plurality of pairs of first and second azimuthal antenna radar positions to form a two dimensional matrix of a plurality of sequences of a plurality of radial velocity measurements, $Vr_{nm}$, for n=1 to N range delays and from=1 to M-1 total radar azimuthal antenna positions.

The method may further include transforming the two dimensional matrix $Vr_{nm}$ from a range delay-azimuthal antenna radar position coordinate system to a Cartesian coordinate system, $Vr_{ab}$, wherein a and b correspond to Cartesian co-ordinates replacing range delay-azimuthal co-ordinates, for a=1 to N range delays and b=1 to N range delays.

The method may further include repeating one or more of the previously mentioned steps for a plurality of antenna radar rotations, to form a three dimensional matrix for the plurality of antenna radar rotations, each having a plurality of sequences of a plurality of radial velocity measurements, $Vr_{abc}$, for a=1 to N range delays, for b=1 to N range delays, and for c=1 to C radar rotations.

The method may further include using a computer processor to extract a plurality of D×D two dimensional sub-matrices to form a three dimensional sub-matrix, $Vr_{DDD}$, from the three dimensional matrix $Vr_{abc}$ for D=1 to 64, based on one or more user selected locations at a user selected location for measurement of interest, within the three dimensional matrix $Vr_{abc}$, one D×D two dimensional matrix for each of D of total of C radar rotations.

The method may further include using a computer processor to extract a plurality of D×D two dimensional sub-matrices to form a three dimensional sub-matrix, $Vr_{DDD}$ from the three dimensional matrix $Vr_{abc}$ for D=1 to 32, based on one or more user selected locations at a user selected location for measurement of interest, within the three dimensional matrix $Vr_{abc}$, one D×D two dimensional matrix for each of D of total of C radar rotations. The method may further include using a computer processor to apply a Fourier transform to the three dimensional sub-matrix $Vr_{DDD}$ to form a three dimensional matrix of complex values frequency-wave number spectrum, $V^T r_{DDD}$ for D wave number samples, and for D of C radar rotations.

The method may also include using a computer processor to generate a three dimensional matrix of power spectrum $|V^T r_{DDD}|^2$, for D wave number samples, and for D of C radar rotations. The method may also include using a computer processor to filter the three dimensional matrix of power spectrum $|V^T r_{DDD}|^2$, with an annulus formed fractionally on either side of a radius $K_d$, wherein $K_d$ is a wave number and d is one of 1 to D/2 positive wave frequencies $\Omega_d$, that satisfies a gravity wave dispersion relation for shallow water.

The computer processor may determine a set of three or more local maximum values within the annulus for each wave frequency, $\Omega_d$, from the step of filtering the three dimensional matrix of power spectrum $|V^T r_{DDD}|^2$, for a plurality of maximum values, one set for each wave frequency, $\Omega_d$. Further a computer may be used to add the plurality of maximum values together to form a quantity $PWR_d$, for each of the plurality of wave frequencies, $\Omega_d$ such that $PWR_d$=SUM (MAX Values of $|V^T r_{ddd}|^2$) of the set in annulus.

The method may further include using a computer processor to determine a one dimensional matrix of wave height-squared spectral components, $H_d^2 = 4*SUM(PWR_d/\Omega_d^2)$, constituting a frequency wave-height spectrum, $H_d^2$, for each of $\Omega_d$, frequencies, for d=1 to D wave frequencies, then determining a final singular value of root-mean-squared waveheight $H_{root\,means\,square}$, as follows: $H_{root\,means\,square} = 4*$ (Sum over all wave frequencies D of $H_d^2)^{1/2}$.

The method may also include using a computer processor to determine a directional spectrum comprised of the values of $H_d^2$, for d=1 to D wave frequencies, along with the radar azimuthal antenna locations of the largest spectral peaks found in a transformed Cartesian wave number pair, $K_x$-$K_y$, plane for each $\Omega_d$, for d=1 to D wave frequencies.

DETAILED DESCRIPTION OF THE DRAWINGS

Figure 1:
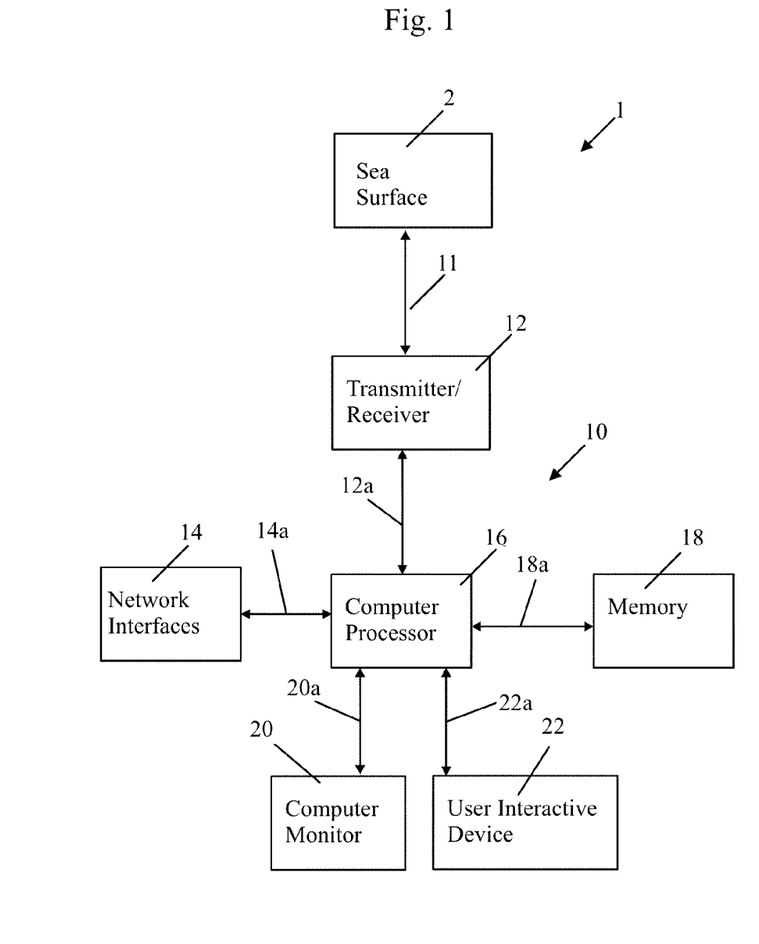
FIG. 1 shows block diagram of an apparatus for use in accordance with an embodiment of the present invention and a sea surface.

FIG. 1 shows a block diagram 1 of an apparatus or radar 10 for use in accordance with an embodiment of the present invention, and a sea or ocean surface 2. The apparatus 10 may include a transmitter/receiver 12 for transmitting wireless signals, such as radio frequency signals over the airwaves or wireless channel 11. The transmitter/receiver 12 may communicate with a computer processor 16 via communications link 12a. The apparatus 10 may also include network interfaces 14, a memory 18, a computer monitor 20, and a user interactive device 22, which may communicate with the computer processor 16 via communications links 14a, 18a, 20a, and 22a, respectively. The communication links 12a-22a may be any type of communications links such as hardwired, wireless, or optical. The memory 18 may be any type of computer memory.

The computer processor may cause the transmitter/receiver 12 to transmit signals. The memory 18, may be a computer memory which may store characteristics of or data relating to signals to be transmitted by the transmitter/receiver 12. The user interactive device 22 may include a computer keyboard, computer mouse, or computer touch screen, any of which can be used to enter characteristics of signals for transmitting from transmitter/receiver 12. Signals, characteristics of signals, or data relating to signals can be displayed on the computer monitor 20 or output or input via network interfaces, such as via the internet, by action of the computer processor 16.

Figure 2:
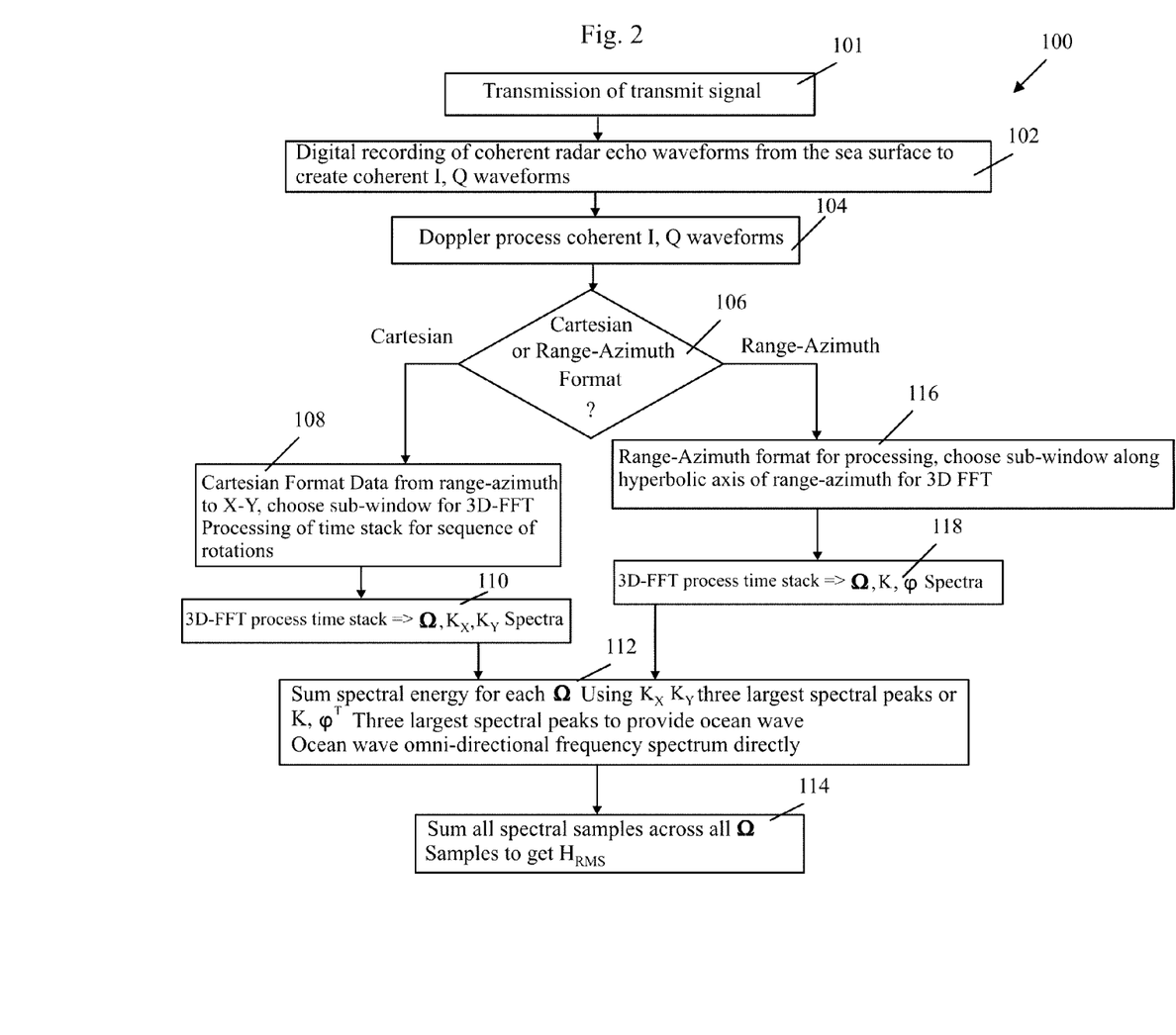
FIG. 2 shows a flow chart of a method in accordance with an embodiment of the present invention.

FIG. 2 shows a flow chart 100 of a method in accordance with an embodiment of the present invention. At step 101, the transmitter/receiver 12 sends out a transmit signal over the air waves or wireless channel 11. The transmit signal may be of fixed phase from one pulse to the next, or of random phase for processing. If fixed phase, the transmit signal may be of a frequency-modulated or chirped waveform suitable for pulse compression, provided by a signal source outside of the radar or apparatus 10, such as by being provided through network interfaces 14. The transmit signal goes out over the airwaves or wireless channel 11 and impacts with sea surface 2 and is returned in a modified form to a receiver of transmitter/receiver 12.

At step 102, coherent (fixed transmit phase) or non-coherent (random-transmit-phase) radar echo waveforms received back from the sea surface 2 as a result of the transmit signal, are recorded by one of two known methods: (1) a single receiver IF channel is recorded producing a real time series of In-Phase samples, $I_1, I_2, \ldots I_N$ for N range samples wherein there is an in-phase sample for each range sample; or (2) the single receive channel is split into two channels and, using a quadrature receiver to introduce a 90-degree phase shift into the second channel, records both In-phase, $I_j$ (for j=1 to N samples) and Quadrature, $Q_j$ (for j=1 to N samples) for further processing. The latter approach can introduce relative phase error into $I_j$, $Q_j$ pairs (for j=1 to N samples), however, and modern systems do not typically use it. The recorded samples in either case are then further processed by the transmitter/receiver 12 and the computer processor 16 typically by one of two received signal processing methods, depending on whether the radar echo waveforms were generated using fixed phase or random phase transmission for the transmit signal from transmitter/receiver 12. If the recorded data were single channel $I_j$ (for j=1 to N samples) samples only, then the first received signal processing method uses fully coherent radar intermediate frequency (IF) sea echo recording of the $I_j$ (for j=1 to N samples) a bi-polar signal in contrast to the positive-only video signal, to create a coherent waveform of in-phase quadrature ($I_j,Q_j$) samples at at every other range sample, N/2 (typically, for a recorded number of 512, 1024, ... $2^M$, an output number $I_j,Q_j$ pair is created of number 256, 512, $2^{M-1}$), wherein M is any integer designating that N will be a power of 2. This is accomplished by taking the N samples of $I_j$ into a 1-dimensional FFT, with zeros filled into the imaginary input samples. After the FFT is performed, one takes the complex samples of the first N/2 spectral output, and performs a 1-dimensional Inverse FFT of N/2 complex samples, thus generating a set of N/2 complex time samples at half the spacing of the original real data for further processing. If, however, the recorded data were $I_j,Q_j$ pairs using a quadrature receiver, then the $I_j,Q_j$, samples are already in hand, at the original sample spacing, and this step of generating the $I_j,Q_j$ pairs is not necessary.

The second received signal method uses a coherent-on-receive radar IF—signal sea echo approach, with signal-processing to create phase-aligned coherent $I_j,Q_j$ (wherein j=1 to N) waveforms in each range, for ranges 1 to N, for either case of recording of real-only $I_j$, for complex pairs of $I_j,Q_j$. This signal processing is done using any method by which the recorded IF transmitted signal pulse, is used in adjustment or realignment of phase of the IF echo portion occurring after the transmit pulse in time. The same method can be used for either recording case of only $I_j$ or of $I_j,Q_j$ pairs (referred to hereafter as "real or complex recorded input samples"), Typically, any one of a number of known signal correlation approaches can be used wherein the transmit pulse IF signal is correlated against the recorded echo IF real or complex recorded signal. In the following discussion of 1D-FFT, the input samples to the FFT are either real or complex samples, determined by the recording method, but the processing is identical for each case. In the case of N FFT input real samples, the complex output samples will be N/2 in number. For N FFT complex input samples, the complex output number of samples will also be N. One such known approach uses the following steps: (1) a one-dimensional Fourier transform (1D-FFT) of the recorded IF transmission radar signal pulse portion of M samples (typically M=20 for a 100 MHz sample rate and standard marine radar pulse lengths, of the 2N samples recorded) with the remaining N-M samples set to zero; and (2) a 1D-FFT of the recorded IF echo return radar signal portion of the same record length, N; (3) complex multiplication of the output complex spectrum of the first (the 1D-FFT of the recorded transmission IF radar signal) times the conjugate of the second (the 1D-FFT of the recorded echo—return IF radar signal) to form a product correlation spectrum; then (3) the inverse 1D-FFT of this product correlation spectrum to retrieve the IF echo correlation time series. Consecutive IF echo correlation time series produced from consecutive transmitted pulses in this way now have aligned phases from one pulse to the next for a fixed non-moving target with zero Doppler shift, which is required for phase difference signal processing to be described later. The first received signal processing method is known and is commonly used in synthetic aperture radars. The second received signal processing method is known and may be commonly used in high power older weather radars. The two received signal processing methods can be used to generate $I_j,Q_j$ samples (for j=1 to N samples) and may be implemented in whole or in part by a computer program stored in computer memory 18 and executed by the computer processor 16.

At step 104 the computer processor 16 executes a Doppler process on the complex in-phase and quadrature ($I_j,Q_j$) samples or waveforms. For either fixed or random phase cases, the doppler process executed may be one of two doppler processes either of which may be implemented by a computer program stored in memory 18 and executed by the computer processor 16 using:

$$\phi_N = ARC\ TAN(I_N/Q_N)$$

In the first doppler process, the computer processor 16 computes a two pulse (for time T and T+τ) doppler phase difference for the received signal received at transmitter/receiver 12, which is: $(d\phi_N = \phi_N^{T+\tau} - \phi_N^T) \Rightarrow$ Doppler shift ($f_D = d\phi/\tau$, where τ is the time between pulses, at each range sample, N.

In the second doppler process, the computer processor 16 determines for each range sample, N, a short-term $J_{BW}$ time-sample ($J_{BW}$=8, 16 or # echo samples in a radar Beam Width, BW, during rotation) waveform Fourier Transform of a $I_j,Q_j$ time sequence to get complex Fourier transformed Doppler spectrum samples $I_J^T,Q_J^T$, which may be stored in computer memory 18. The computer processor 16 is also programmed by a computer program which may reside in memory 18 to calculate a power spectrum, $P_J$, of J samples using the equation $P_J=(I_J^T)^2+(Q_J^T)^2$. The computer processor 16 may be programmed to determine the maximum power sample of the set, $P_{JMAX}$, at sample # $JMAX_N$ for the N range samples. This determines the mean Doppler shift, $f_{DN}$ from this Doppler spectrum peak at each range sample, N: $f_{DN}=(JMAX_N/J_{BW})/\tau$, which also may be determined by the computer processor 16 in accordance with a computer program stored in memory 18.

At step 106 the computer processor 16 determines whether cartesian coordinates or range-azimuth coordinates are going to be used. An individual human operator can enter information into the user interactive device 22 to determine whether cartesian coordinates or range-azimuth coordinates are going to be used by the computer processor 16. If cartesian coordinates are going to be used, then at step 108, range azimuth data from the received signal is changed to cartesian format data. The computer processor 16 may be programmed to use a sub-window of M×M (e.g., 64×64) samples from a Cartesian scene, chosen by the user, as input for an M time-scan sequence of such windows for input to a three dimensional fast Fourier transform (3D FFT) of processing of time stack for sequence of rotations is entered by an individual human operator using user interactive device 22. The location of the sub-window can also be stored in a prearranged location by the user in a parameter file that is read into the computer processor 16 from the memory 18 or from another source via network interfaces 14.

Figure 6:
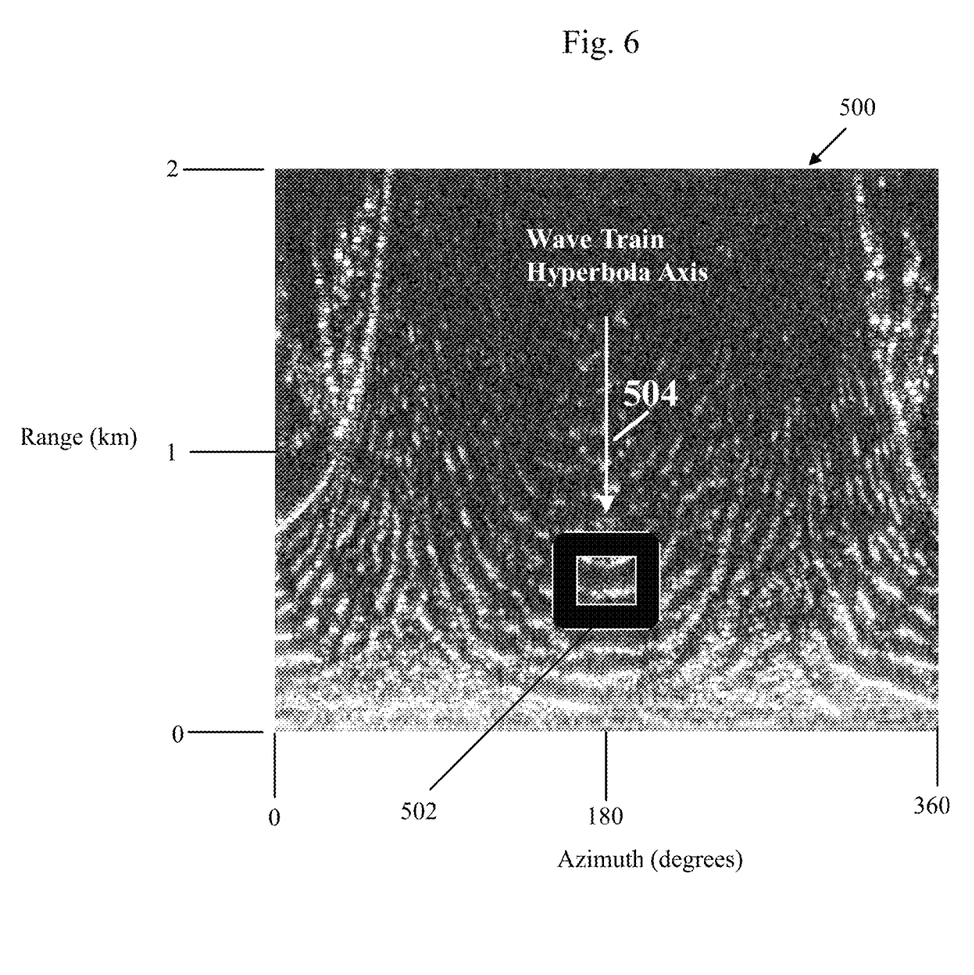
FIG. 6 is a diagram of range-azimuth images of intensity of received signal transmitter/receiver, showing alignment along hyperbola axis of window chosen for time series.

If range-azimuth coordinates are going to be used, then the process continues from step 106 to step 116. A window is chosen, typically by an operator, but alternatively by computer processor 16, from the range-azimuth display without Cartesian transform, as shown in FIG. 6, at a location near perpendicular to the axis of the hyperbolic wave pattern as indicated. The computer processor 16 is programmed to extract a time sequence of such sub-windows similar to the previous case, and the computer processor 16 is programmed to perform the same 3D Fourier transform analysis. The direction of the axis chosen for the hyperbola, in at least one embodiment, must be recorded, and is typically recorded or stored by the computer processor 16 in the computer memory 18 to derive the primary direction of the directional wave spectrum, which is different from the previous Cartesian method, where the direction will be determined by the 3D-FFT process.

At step 110 a three dimensional fast fourier transform (3D FFT) of the window data of the received signal received at the transmitter/receiver 12 is executed by the computer processor 16, such as by a computer program stored in the computer memory 18, to determine the parameters $\Omega$, $K_x$, $K_y$ (wherein $\Omega$ is a wave-frequency, $K_x$ is an x axis coordinate of a wavenumber, and $K_y$ is a y axis coordinate of a wave number, such that there are plurality of wave frequencies $\Omega$ and a corresponding plurality of wave numbers, $K_x$, $K_y$, wherein the plurality of wave numbers $K_x$, $K_y$ make up the wave number spectra for Cartesian data), or $\Omega$, K, $\phi^T$ (wherein $\Omega$ is a wave-frequency, K is a wave-number-magnitude, and $\phi^T$ is an angle-spread, such that there are a plurality of wave-frequencies, and a corresponding plurality of wave-number magnitudes and angle spreads, wherein the plurality of wave number magnitudes K and angle-spreads $\phi^T$ make up spectra for range-azimuth data). This use of 3D-FFT analysis of IF radar echo signals above is somewhat similar to that applied in U.S. Pat. No. 6,775,617 to Seemann, which is incorporated herein by reference, in which a radar video signal was used as input data for analysis, versus the coherent IF signal used in one or more embodiments of the present application.

Figure 7:
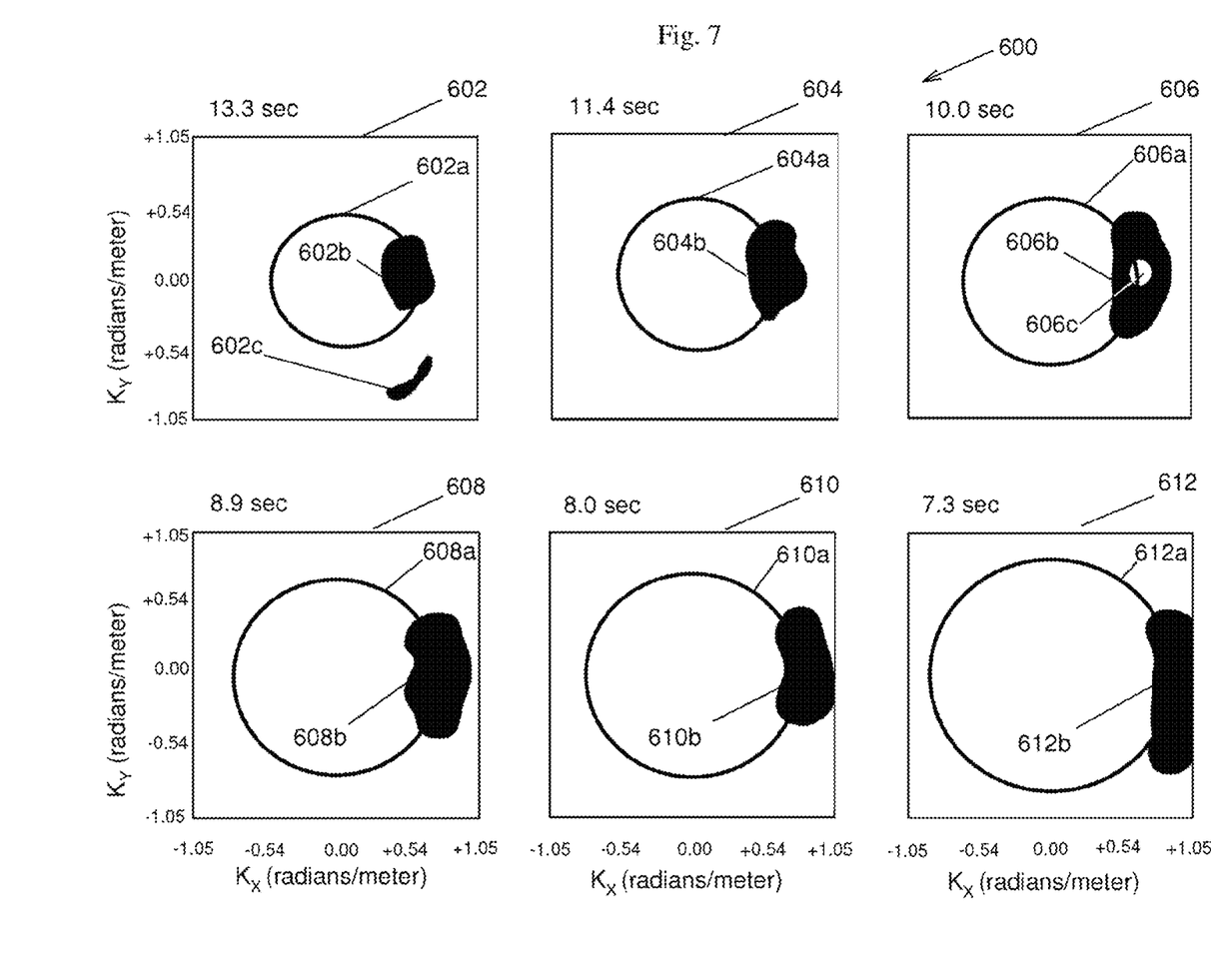
FIG. 7 is a diagram showing six of thirty-two wave number spectra plotted from three dimensional fast fourier transform (3D-FFT) analysis of phase difference imagery of FIG. 5.

Each $K_x$-$K_y$ plane for each frequency, $\Omega$, as is shown in FIG. 7 has a ring determined by the user from K-circle radius determined by the computer processor 16 using the ocean wave dispersion equation circle:

Equation (1) $\Omega=[g(Kx^2+Ky^2)TAN H(KD)]^{1/2}$ where D is the local water depth, g is gravitational constant, 9.81 meters/second$^2$, Tan h is the hyperbolic tangent, and K is the wave number magnitude). The computer processor 16 is programmed by a computer program stored in memory 18 to fix a percent of this K-circle radius satisfying equation (1) to search for echo energy in each $K_x$-$K_y$ spectrum to, for example between 80% and 120% of the K-circle radius, to allow for added current shifts about the 100% expected circle. In this example the area between 80% and 120% of the K-circle radius may be called a "donut area". In at least one embodiment of the present invention, the computer processor 16 is programmed to find the three largest peaks of spectral energy that results from the 3D-FFT in this donut area and sum them the three largest peaks up to determine the net orbital radial velocity.

At step 112, the computer processor 16 (as programmed by a computer program stored in memory 18) sums spectral energy for each $\Omega$ using $K_x$, $K_y$ or K, $\phi^T$, one to three largest spectral peaks to provide ocean wave omni-directional frequency spectrum directly.

At step 114, the computer processor 16 (as programmed by a computer program stored in memory 18) sums all spectral samples across all $\Omega$ samples to obtain the root-mean-square wave height, $H_{RMS}$. The method begins by the computer processor using the relationship between a position X(t) of a particle on the water surface at a time 't', and the ocean wave height, H, for a given ocean wave frequency component, $\Omega$, to determine X(t) by the following equation:

$$X(t)=(H/2)\sin(\Omega t) \quad \text{Equation (2)}$$

The horizontal velocity of that point on the water surface, the corresponding time derivative and the horizontal velocity may be determined by the computer processor 16 by the following equation: Equation (3) $V=dX(t)/dt=(H/2)\Omega \cos(\Omega t)$. At the crest of a wave, the maximum horizontal velocity occurs, and is: Equation (4) $V_{MAX}=H\Omega/2$, while at the wave trough is the negative of the crest value, or $-V_{MAX}$. Equation (4) may also be determined by the computer processor 16. The horizontal velocity is related to the Doppler shift measure by the radar by: Equation (5) $V=F_D*\lambda/2$, where $\lambda$ is the radar wavelength, 3.2 cm for a marine radar operating at 9,375 MHz. The power spectrum produced by the 3D-FFT processing by the computer processor 16 and spectral peak location discussed earlier produces peak values of $(F_D)^2$, which may be determined by computer processor 16 and stored in computer memory 18. Thus, $H_i^2$ for each wave frequency, $\Omega_i$, is determined by the computer processor 16 by combining the above equations: Equation (6) $H_i^2=4(V/\Omega_i)^2=4(F_D*\lambda/(2\Omega_i))^2$. The computer processor 16 implementing a computer program stored in computer memory 18, sums these values of $H_i^2$ over all ocean wave frequencies, $\Omega_i$, and takes the square root of that sum to determine the root-mean-square wave height, $H_{RMS}$, by the Equation (7) $H_{RMS}=4*SQRT$ (SUM over $H_i^2$), which may be stored in computer memory 18. This quantity is one desired output for ocean wave spectrum summary measurements. The directional wave height spectrum, in 3D notation, is arrived at by the computer processor 16 scaling the power spectrum in $F_D^2$ to $H^2$ using equation (6) in accordance with a computer program stored in the computer memory 18.

Figure 3:
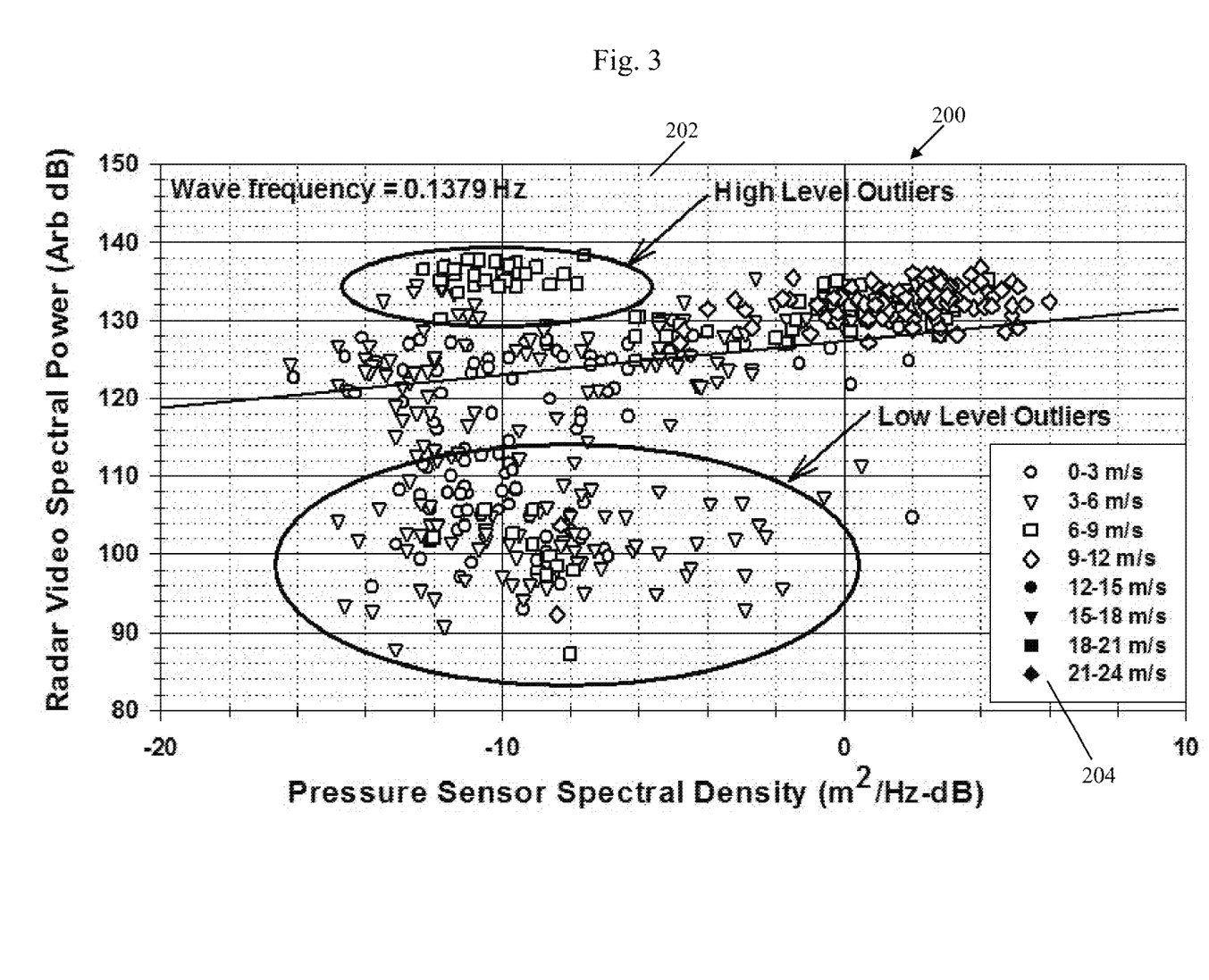
FIG. 3 is a diagram showing radar video spectral power versus pressure sensor spectral density, sorted by winds speed, derived using old technology, with areas showing errors identified as outliers.

FIG. 3 is a diagram 200 showing radar video spectral power versus pressure sensor spectral peaks, sorted by winds speed. FIG. 3 represents results using previous known methods applying the modulation transfer function (MTF) approach to radar video data, and is shown to demonstrate problems with the old method as the "high level outliers". The "low level outliers" will be a problem for all radar approaches when the wind speed is very low or natural and man-made slicks occur. Generally this method gives reasonable fits for ocean wind speeds above four meters/second. "High level outliers" occur when winds blow opposite the wave direction, leading to overestimates of wave height from radar data using the old approach of FIG. 3 based on video signal recording instead of IF (Intermediate) signal recording demonstrated in one or more embodiments of the present invention.

The diagram 200 includes a chart or graph 202 and a legend 204. The legend 204 identifies wind speed groupings. In the legend 204 a circle identifies a wind speed in the range of 0-3 meters/second, an upside down triangle identifies a wind speed in the range of 3-6 meters/second, a square identifies a wind speed in the range of 6-9 meters/second, a diamond identifies a wind speed in the range of 9-12 meters per second, a filled circle identifies a wind speed in the range of 12-15 meters/second, a filled upside down triangle identifies a wind speed of 15-18 meters/second, a filled square identifies an ocean wave of 18-21 meters/second, a filled diamond identifies a wave of 21-24 meters per second.

In the graph 202 the x-axis is labeled "Pressure Sensor Spectral Density (m2/Hz-dB)" meters squared per Hertz Decibel, which represents pressure sensor spectral density as measured by the U.S. Army Corps of Engineers Field Site pressure sensor array, Field Research Facility, Duck, N.C.

In the graph 202 the y-axis is labeled "Radar Video Spectral Power", which indicates the spectral power of a received video radar signal at transmitter/receiver 12.

In FIG. 3, the wave frequency of an ocean wave is indicated as 0.1379 Hertz, and is one of the thirty-two values of $\Omega/2\pi$ discussed above. "High Level Outliers" are shown circled in FIG. 3. "Low Level Outliers" are shown circled in a different circle from "High Level Outliers".

Figure 4:
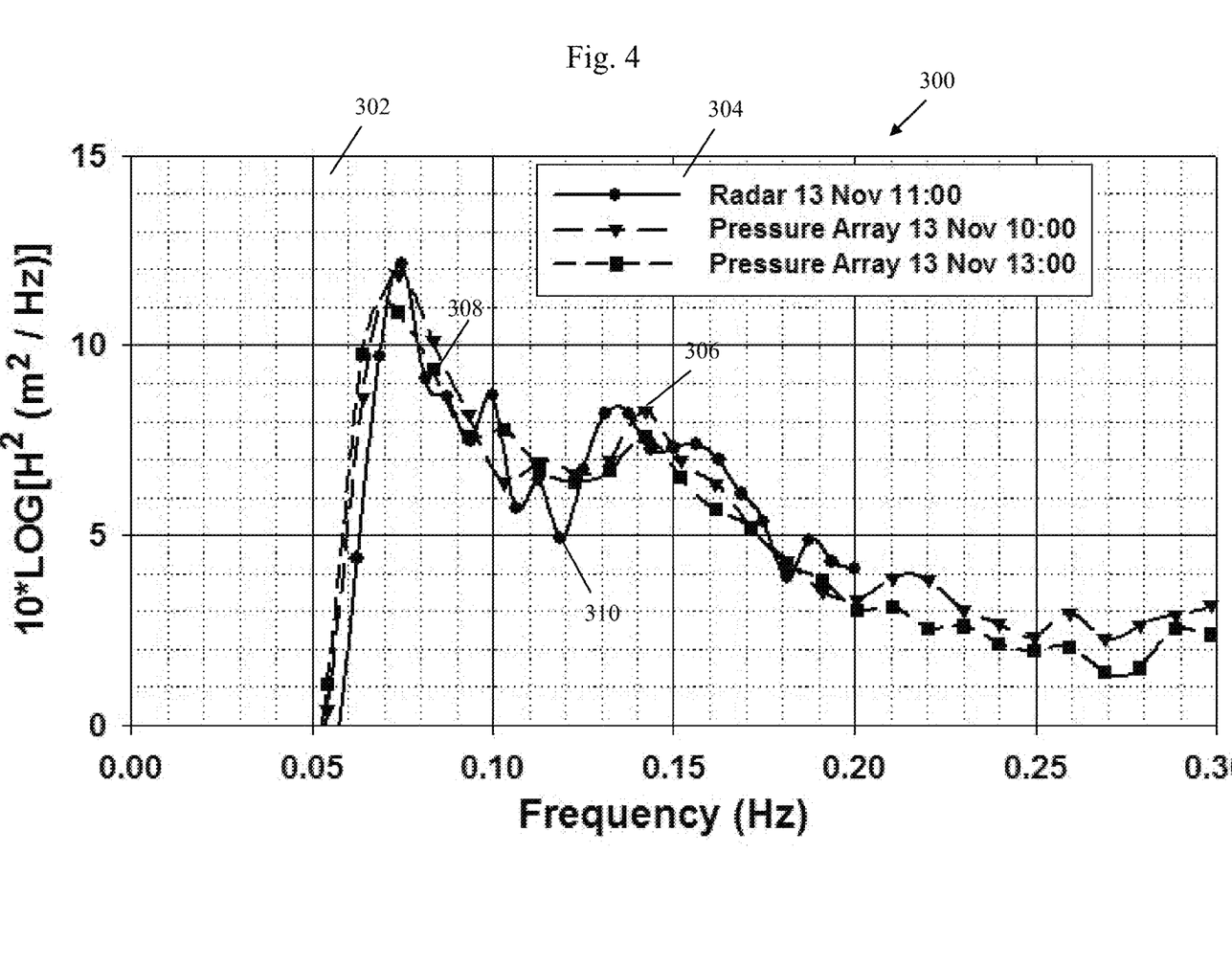
FIG. 4 is a diagram showing resulting frequency spectrum comparison of an embodiment of the present invention with the existing pressure sensor array at the FRF (Field Research Facility) for two time adjacent periods, data for the existing pressure sensor array provided by FRF web site records.

FIG. 4 is a diagram 300 showing a plot of $10*\mathrm{Log}_{10}(H_i^2)$ (in meters squared per Hertz on the y-axis) vs. wave frequency, $\Omega_i/2\pi$, (in Hertz on the X-axis) for i=1 to 32. The diagram 300 includes the graph or chart 302 and the legend 304. The legend 304 indicates that the circles stand for radar-derived $H_i^2$ on November 13, 11:00 a.m. data received at the transmitter/receiver 12. The legend 304 indicates that the upside down triangles in FIG. 4, stand for pressure array $H_i^2$ November 13, 10:00 a.m. data. The legend 304 indicates that the squares in FIG. 4 stand for pressure array $H_i^2$ November 13, 1:00 p.m. data. In FIG. 4, the y-axis is labeled "10*LOG $[H^2(m^2/Hz)]$" and the x-axis is labeled "Frequency (Hz)". FIG. 4 shows curve 308 for square data, curve 306 for triangular data, and curve 310 for circle data.

Figure 5:
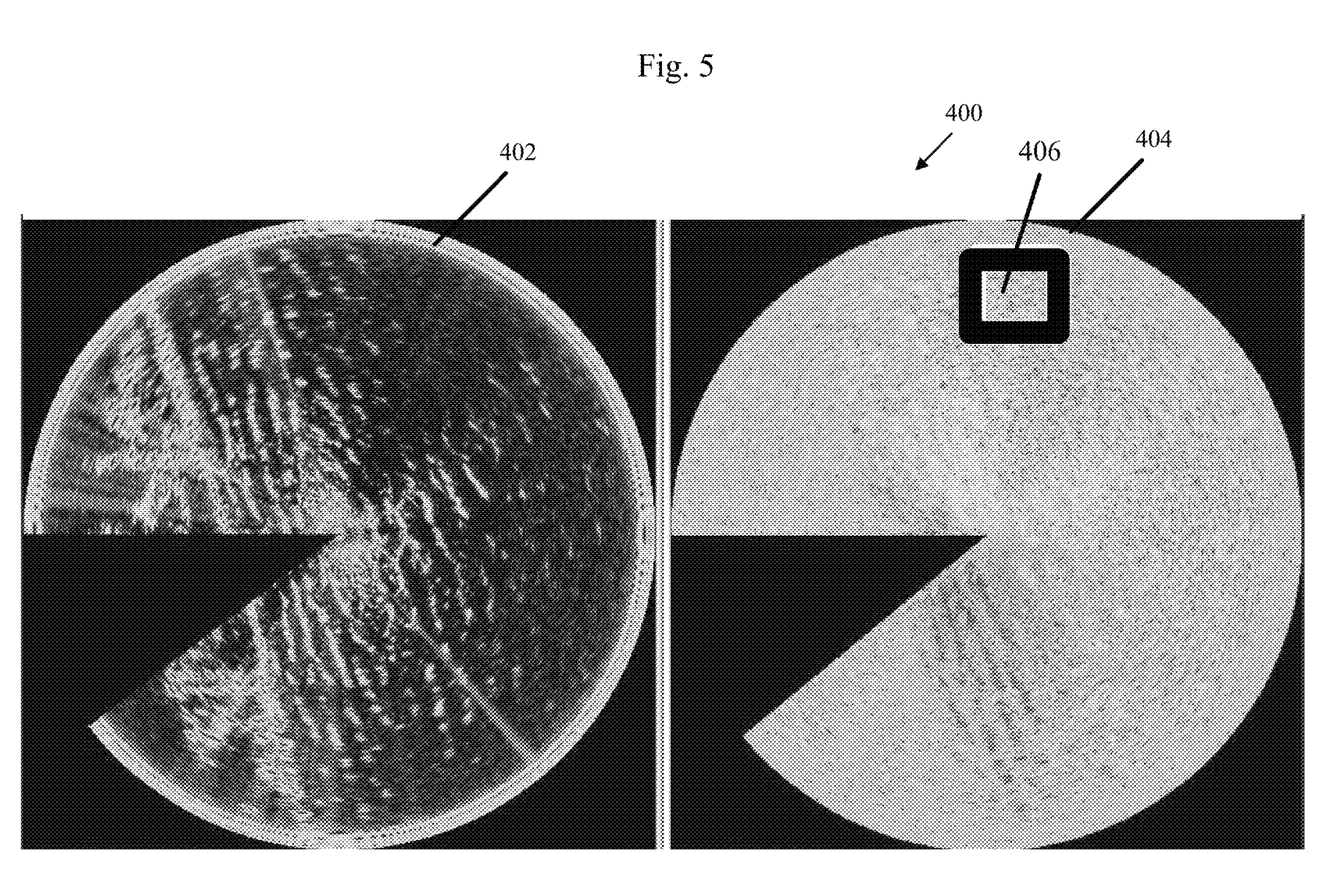
FIG. 5 is a diagram of (I) cartesian images of intensity of received signal at a transmitter/receiver and (2) mean two-pulse phase differences for one day during the passage of Hurricane Ida offshore in late November of 2009.

FIG. 5 is a diagram 400 showing two Cartesian transformed radar images 402 and 404 for a single rotation. The image 402 is derived from traditional video data received at transmitter/receiver 12 of FIG. 1. The image 404 is derived from IF (intermediate frequency) data received at the transmitter/receiver 12 using two-pulse differencing method described above. A box, location, or field 406 indicates the typical location and 64×64 pixel size of a window to be extracted for 3D-FFT processing described previously.

FIG. 6 is a diagram 500 showing an image of radar data in raw range-azimuth coordinates. A box, location, or field 502 indicates a location of a 64×64 pixel size window to be extracted for 3D-FFT processing described previously. The arrow and line or axis 504 shows the location in azimuth angle of the axis of symmetry of the hyperbolic patterns on incoming ocean waves. In FIG. 6 the y-axis is range in kilometers and the x-axis is azimuth in degrees. In FIG. 6 the image or diagram 500 or window for the diagram 500 has been chosen, such as by an operator using computer or user interactive device 22 or by the computer processor 16 as programmed by a computer program in memory 18, to by centered along axis to wave train hyperbola group, i.e. centered with respect to arrow and line or axis 504.

FIG. 7 shows a diagram 600 of a sequence of six of thirty-two $K_x$-$K_y$ spectra that are produced by the 3D-FFT process by the computer processor 16, executing a computer program stored in memory 18, operating on Cartesian images. FIG. 7 shows spectra and/or images of spectra 602, 604, 606, 608, 610, and 612 for ocean wave periods 13.3, 11.4, 10.0, 8.9, 8.0, and 7.3 seconds respectively, where each wave period is 1/frequency, i.e. $2\pi/\Omega_i$. The images 602, 604, 606, 608, 610, and 612 may be displayed on computer monitor or display 20 by the computer processor 16 in accordance with a computer program stored in computer memory 18. The date on which the images were determined may be displayed above the images 602, 604, 606, 608, 610, and 612. The quantities $K_y$ and $K_x$ are shown in the images in radians/meter.

FIG. 7 shows six of thirty-two different wave number spectra, for six different wave frequencies (i.e. six different $\Omega$, corresponding to six different time periods T). For example 0.1 Hz frequency $\Omega$ is 10 second wave period T. In FIG. 7 circles 602a, 604a, 606a, 608a, 610a, and 612a, in the images 602, 604, 606, 608, 610, and 612, respectively, represent radii determined by the dispersion relation for gravity waves discussed previously in equation (1). The outer region areas 602b, 604b, 606b, 608b, 610b, and 612b, lying on these circles, represent regions of the ocean wave spectrum where the spectral energy is a maximum. The region 602c represents echo energy that does not satisfy the dispersion relation for gravity waves, and is probably due to atmospheric modulations of sea surface roughness. The inner region area 606c represent an area of even higher spectral energy then the black areas, so defining this 10.0-sec spectrum as the maximum of the group, and the dominant wave period as ten seconds. The direction of this maximum peak along the positive $K_x$ axis is ninety degrees relative to zero degrees North being along the +$K_y$ axis, thus defining the dominant wave direction as ninety degrees relative to zero degrees north.

In accordance with at least one embodiment of the present invention, a fully coherent marine radar has been developed for imaging ocean wave orbital wave velocity with a 0.8-Hz radar rotation rate and 1.25 second image repetition period, providing a direct measurement of wave height profiles, without relying on the MTF as discussed above. The radar rotation rate and the image repetition period may be stored in the computer memory 18 and may be executed by the computer processor 16 in conjunction with the transmitter/receiver 12 which may be controlled by the computer processor 16.

In one embodiment, a Koden (trademarked) marine radar pedestal was used, with all of its components replaced with microwave components to produce a fully coherent radar prototype. FM chirp pulse compression is used by the computer processor 16 to improve the effective coherent output power or the transmit signal from the transmitter/receiver 12.

The transmit waveform may be generated by an Imaging Science Research, Inc. Quadrapus transceiver PC (personal computer) card, which may be described as being part of the computer processor 16. Additional signal gain is achieved by summing successive echo waveforms in a field-programmable gate array (FPGA) on a transceiver card, which may be part of transmitter/receiver 12 before recording the waveform to storage media, such as the memory 18. Typical operation uses a 50,000 Hz pulse repetition frequency (PRF) for the transmit signal from the transmitter/receiver 12 on transmit, sums fifty or twenty-five pulses, giving a one or two KHz (kilohertz) record (pulse repetition frequency), providing 22 to 25-dB (decibels) gain, almost making up for the factor of 5,000 in transmitted peak power.

The recorded signal, recorded in memory 18, is the output intermediate frequency of the radar, with a single channel in-phase sample only, providing real data, typically at a 100-MHz (Mega Hertz) sample rate, producing samples at every 10 nanoseconds, or 1.5 meter in radar range. Pulse compression is provided by the computer processor 16 and gives complex in-phase (I) and quadrature (Q) outputs at a 3 meter spacing. The arctangent of the I/Q ratio calculated by the computer processor 16 for each range bin gives the phase of each. Phase difference, $d\phi$ between adjacent pulses of the recorded IF echo signal provides a measure of rate of change of phase shift (radians/second), or Doppler shift (Hertz), $d\phi dt=f_D$, by the computer processor 16 dividing this phase difference by the period between transmit pulses from the transmitter/receiver 12. This in turn is related to the radial velocity of an echo by the Doppler equation:

$$V_D = f_D * \lambda/2$$

In one embodiment, the radar (including apparatus 10 in FIG. 1) was mounted on a tower at the end of the Field Research Facility pier (located on the Atlantic Ocean, near the town of Duck, N.C.) 600 meters offshore. Cartesian images of intensity (left, part 402 of the diagram 400) and mean two-pulse phase differences (right, part 404 of the diagram 400) are seen in FIG. 5, for one day during the passage of Hurricane Ida offshore in late November of 2009. The radial Doppler radial velocity scales from −8 m/s to 8 m/s for the 1-KHz (Kilo Hertz) recording PRF (pulse repetition frequency) for transmitter/receiver 12. For the diagrams of FIG. 5, 985 pixels or 2955 meter diameter was used for each of parts 402 and 404. 16×16-pixel windows were placed over the FRF (Field Research Facility) pressure array for the three dimensional fast fourier transform (3D FFT) analysis.

Three dimensional Fast fourier transform (3D-FFT) analysis of four sets of sixty-four rotations produced radial velocity wave number spectra for each of thirty-two positive and negative frequencies ranging between −0.4 to 0.4 Hz, with symmetry across 0 frequency, resulting in just thirty-two frames of useful spectra FIG. 7 shows an example results for six of these thirty-two frequencies, user selectable, by using user interactive device 22 of FIG. 1, for phase-difference image processing. The coastline at the FRF (Field Research Facility) is shore-normal at sixty-eight degrees, so true North is up in the spectra and images.

In FIG. 7, six of thirty-two wave number spectra are plotted from three dimensional fast fourier transform (3D-FFT) analysis of phase difference imagery of FIG. 5, showing spectral energy peaking near 10.0-second period ocean waves (whitened center area is maximum value of all six $K_x$, $K_y$ spectra). If the spectral peak energy is summed over a area of three by three pixels about each peak, then plotting these values results in a frequency spectrum for that area. FIG. 4 shows resulting frequency spectrum comparison with the existing pressure sensor array permanent system at the FRF (Field Research Facility) for two time adjacent periods. In FIG. 4, the frequency spectrum derived from spectral peaks of thirty-two $K_x$, $K_y$ spectra as in FIG. 7, with comparison results from FRF (Field Research Facility) pressure-array spectrum for overlapping analysis periods.

Figure 8:
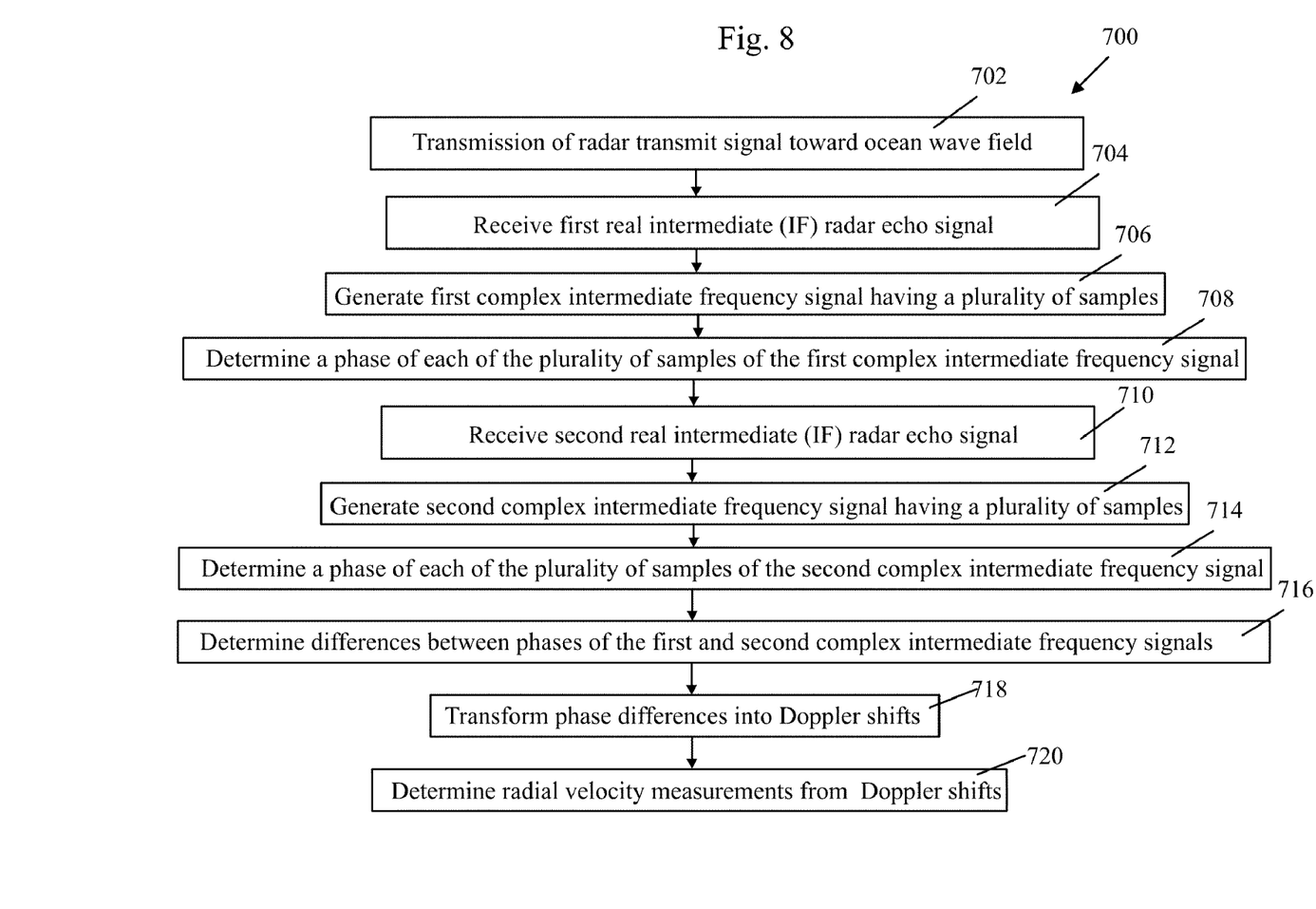
FIG. 8 shows a flow chart of another method in accordance with another embodiment of the present invention.

FIG. 8 shows a flow chart 700 of another method in accordance with another embodiment of the present invention. The method shown by the flow chart 700 may be executed in whole or in part by the computer processor 16 of FIG. 1 implementing a computer program stored in computer memory 18. At step 702, a radar transmit signal is transmitted towards an ocean wave field, such as transmitted out from transmitter/receiver 12 in response to signals from the computer processor 16, towards the sea surface or ocean wave field 2. The radar transmit signal may be comprised of a plurality of pulses including a first pulse and a second pulse. The apparatus or radar 10 may be a marine radar device.

At step 704, the marine radar device, such as 10 may receive a first real intermediate (IF) radar echo signal, at a first azimuthal radar antenna position. The transmitter/receiver 12 may include an antenna and/or receiver. The receiver or antenna of 12 may be oriented at a first azimuthal radar antenna position. The first real intermediate (IF) radar echo signal is comprised of a plurality of samples and is received as a result a radar transmit signal first pulse of the radar transmit signal, interacting with the ocean wave field, such as 2.

At step 706, a computer processor, such as 16, may generate a first complex intermediate frequency signal from the first real intermediate (IF) radar echo signal. The first complex intermediate frequency signal may be comprised of a plurality of samples, wherein each sample of the plurality of samples of the first complex intermediate frequency signal has a real part $I_j$ and an imaginary part $Q_j$, wherein j indicates a number of a sample of the plurality of samples of the first complex intermediate frequency signal; and wherein each sample of the plurality of samples of the first complex intermediate frequency signal corresponds to a range delay, such that there are a plurality of range delays for a corresponding plurality of samples of the first complex intermediate frequency signal. Each range delay of the plurality of range delays, corresponds to a certain distance range from the transmitter/receiver 12.

At step 708, a computer processor, such as 16, may determine a phase of each sample of the first complex intermediate frequency signal by taking the arc tangent of the ratio of $I_j/Q_j$, so that a first plurality of phases are determined for the corresponding plurality of samples of the first complex intermediate frequency signal. The computer processor 16 may also store the first plurality of phases for the first complex intermediate frequency signal in computer memory, such as 18.

At step 710, a receiver or antenna of the transmitter/receiver 12 may receive a second real intermediate frequency (IF) radar echo signal, at a second azimuthal radar antenna position, comprised of a plurality of samples, at the marine radar device 10, as a result of a second pulse of the radar transmit signal interacting with the ocean wave field 2.

At step 712, the computer processor 16 may generate a second complex intermediate frequency signal from the second real intermediate (IF) radar echo signal. The second complex intermediate frequency signal may be comprised of a plurality of samples, wherein each sample of the plurality of samples of the second complex intermediate frequency signal has a real part $I_k$ and an imaginary part $Q_k$, wherein k indicates a number of a sample of the plurality of samples of the second complex intermediate frequency signal; and wherein each sample of the plurality of samples of the second complex intermediate frequency signal corresponds to a range delay of the plurality of range delays.

At step 714, a computer processor, such as 16, may determine a phase of each sample of the second complex intermediate frequency signal by taking the arc tangent of the ratio of $I_k/Q_k$, so that a second plurality of phases are determined for the corresponding plurality of samples of the second complex intermediate frequency signal. The computer processor 16 may store the second plurality of phases for the second complex intermediate frequency signal in the computer memory 18.

At step 716, the computer processor 16 may determine the difference between each phase of the first plurality of phases and each phase of the second plurality of phases for a corresponding range delay of the plurality of range delays to determine a plurality of phase differences for the corresponding plurality of range delays. The computer processor 16 may store the plurality of phase differences in computer memory 18.

At step 718 the computer processor 16 may transform each of the phase differences in radians into a Doppler shift for each range delay of the plurality of range delays by dividing each of the plurality of phase differences by the time period between the radar transmit signal first pulse and the radar transmit signal second pulse, so that a plurality of Doppler Shifts are formed one for each range delay of the plurality of range delays.

At step 720 the computer processor 16 may determine a first sequence of a plurality of radial velocity measurements of the ocean wave field from the plurality of Doppler shifts by multiplying each of the plurality of Doppler shifts by one half a wavelength of the first radar transmit signal.

The step of generating the first complex intermediate frequency signal may include using a microwave quadrature coupler hardware device, which may be part of the computer processor 16 or which may be a separate device, to generate the first complex intermediate frequency signal. Similarly, the step of generating the second complex intermediate frequency signal may include using a microwave quadrature coupler hardware device.

The step of generating the first complex intermediate frequency signal may include using a computer processor, such as the computer processor 16, implementing a computer software program to generate the first complex intermediate frequency, $(I,Q)^1$, signal by applying the Hilbert Transform to the first real intermediate frequency (IF) radar echo signal. Similarly, the step of generating the second complex intermediate frequency signal may include using a computer processor, such as the computer processor 16, implementing a computer software program to generate the second complex intermediate frequency signal, $(I,Q)^2$, by applying the Hilbert Transform to the second real intermediate frequency (IF) radar echo signal.

The steps shown in FIG. 8 and previously described above may be repeated for a plurality of pairs of different first and second azimuthal radar positions to form a two dimensional matrix of a plurality of sequences of a plurality of radial velocity measurements, $Vr_{nm}$, for n=1 to N range delays and from =1 to M-1 total radar azimuthal antenna positions. The computer processor 16 may transform the two dimensional matrix $Vr_{nm}$, from a range delay-azimuthal antenna radar position coordinate system to a Cartesian coordinate system, $Vr_{ab}$, wherein a and b correspond to Cartesian co-ordinates replacing range delay-azimuthal coordinates, for a=1 to N range delays and b=1 to N range delays.

The steps shown in FIG. 8 and referred to above for a plurality of pairs of different first and second azimuthal radar positions can be repeated by the computer processor 16, in accordance with a computer program, for a plurality of antenna radar three hundred and sixty-degree rotations, in accordance with an embodiment of the present invention, to form a three dimensional matrix for the plurality of antenna radar rotations, each having a plurality of sequences of a plurality of radial velocity measurements, $Vr_{abc}$, for a=1 to N range delays, for b=1 to N range delays, and for c=1 to C radar rotations.

The computer processor 16 can extract a plurality of D×D two dimensional sub-matrices to form a three dimensional sub-matrix, $Vr_{DDD}$, from the three dimensional matrix $Vr_{abc}$ for D=1 to 64, or for D=1 to 32, based on one or more user selected locations at a user selected location for measurement of interest, within the three dimensional matrix $Vr_{abc}$, one D×D two dimensional matrix for each of D of total of C radar rotations.

The computer processor 16, in at least one embodiment, may apply a Fourier transform to the three dimensional sub-matrix $Vr_{DDD}$ to form a three dimensional matrix of complex values frequency-wave number spectrum, $V^T r_{DDD}$ for D wave number samples, and for D of C radar rotations. The computer processor 16 may generate a three dimensional matrix of power spectrum $|V^T r_{DDD}|^2$, for D wave number samples, and for D of C radar rotations. The computer processor 16 may filter the three dimensional matrix of power spectrum $|V^T r_{DDD}|^2$, with an annulus formed fractionally on either side of a radius $K_d$, wherein $K_d$ is a wave number and d is one of 1 to D/2 positive wave frequencies $\Omega_d$, that satisfies a gravity wave dispersion relation for shallow water. The computer processor 16 may determine a set of local maximum values in the annulus for each wave frequency, $\Omega_d$, from the step of filtering the three dimensional matrix of power spectrum $|V^T r_{DDD}|^2$, for a plurality of maximum values in the annulus, one set for each wave frequency, $\Omega_d$, and the computer processor 16 may add the plurality of maximum values together to form a quantity $PWR_d$, for each of the plurality of wave frequencies, $\Omega_d$ such that $PWR_d$=SUM(MAX Values of $|V^T r_{ddd}|^2$) of set in annulus.

The computer processor 16 may determine a one dimensional matrix of wave height-squared spectral components, $H_d^2 = 4*SUM(PWR_d/\Omega_d^2)$, constituting a frequency wave-height spectrum, $H_d^2$, for each of $\Omega_d$, frequencies, for d=1 to D wave frequencies, then determining a final singular value of root-mean-squared waveheight $H_{root\ means\ square}$, as follows:

$$H_{root\ means\ square} = 4*(\text{Sum over all wave frequencies } D \text{ of } H_d^2)^{1/2}.$$

The computer processor 16 may determine a directional spectrum comprised of the values of $H_d^2$, for d=1 to D wave frequencies, along with the radar azimuthal antenna locations of the largest spectral peaks found in a transformed Cartesian wave number pair, $K_x$-$K_y$, plane for each $\Omega_d$, for d=1 to D wave frequencies.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A method of determining a plurality of wave heights of an ocean wave field comprising:

receiving a first real intermediate frequency (IF) radar echo signal, at a first azimuthal radar antenna position, comprised of a plurality of samples, at a marine radar device, as a result of a radar transmit signal first pulse interacting with the ocean wave field;

generating a first complex intermediate frequency signal from the first real intermediate (IF) radar echo signal;

wherein the first complex intermediate frequency signal is comprised of a plurality of samples, and wherein each sample of the plurality of samples of the first complex intermediate frequency signal has a real part $I_j$ and an imaginary part $Q_j$, wherein j indicates a number of a sample of the plurality of samples of the first complex intermediate frequency signal;

wherein each sample of the plurality of samples of the first complex intermediate frequency signal corresponds to a range delay, such that there are a plurality of range delays for a corresponding plurality of samples of the first complex intermediate frequency signal;

using a computer processor to determine the phase of each sample of the first complex intermediate frequency signal by taking the arc tangent of the ratio of $I_j/Q_j$, so that a first plurality of phases are determined for the corresponding plurality of samples of the first complex intermediate frequency signal;

storing the first plurality of phases for the first complex intermediate frequency signal in computer memory;

receiving a second real intermediate frequency (IF) radar echo signal, at a second azimuthal radar antenna position, comprised of a plurality of samples, at the marine radar device, as a result of a radar transmit signal second pulse interacting with the ocean wave field;

generating a second complex intermediate frequency signal from the second real intermediate (IF) radar echo signal;

wherein the second complex intermediate frequency signal is comprised of a plurality of samples, and wherein each sample of the plurality of samples of the second complex intermediate frequency signal has a real part $I_k$ and an imaginary part $Q_k$, wherein k indicates a number of a sample of the plurality of samples of the second complex intermediate frequency signal;

wherein each sample of the plurality of samples of the second complex intermediate frequency signal corresponds to a range delay of the plurality of range delays;

using a computer processor to determine the phase of each sample of the second complex intermediate frequency signal by taking the arc tangent of the ratio of $I_k/Q_k$, so that a second plurality of phases are determined for the corresponding plurality of samples of the second complex intermediate frequency signal;

storing the second plurality of phases for the second complex intermediate frequency signal in computer memory;

using a computer processor to determine the difference between each phase of the first plurality of phases and each phase of the second plurality of phases for a corresponding range delay of the plurality of range delays to determine a plurality of phase differences for the corresponding plurality of range delays;

storing the plurality of phase differences in computer memory;

wherein there is a time period between the radar transmit signal first pulse and the radar transmit signal second pulse;

using a computer processor to transform each of the plurality of phase differences in radians to a Doppler shift of each range delay of the plurality of range delays by dividing each of the plurality of phase differences by the time period between the radar transmit signal first pulse and the radar transmit signal second pulse, so that a plurality of Doppler Shifts are formed one for each range delay of the plurality of range delays;

wherein the radar transmit signal first pulse and the radar transmit signal second pulse are part of a radar transmit signal having a wavelength; and using a computer processor to determine a first sequence of a plurality of radial velocity measurements of the ocean wave field from the plurality of Doppler shifts by multiplying each of the plurality of Doppler shifts by one half the wavelength of the first radar transmit signal.

2. The method of claim 1 wherein generating the first complex intermediate frequency signal includes using a microwave quadrature coupler hardware device to generate the first complex intermediate frequency signal; and generating the second complex intermediate frequency signal includes using a microwave quadrature coupler hardware device to generate the second complex intermediate frequency signal.

3. The method of claim 1 further comprising generating the first complex intermediate frequency signal includes using a computer processor implementing a computer software program to generate the first complex intermediate frequency, $(I,Q)^1$, signal by applying the Hilbert Transform to the first real intermediate frequency (IF) radar echo signal; and generating the second complex intermediate frequency signal includes using a computer processor implementing a computer software program to generate the second complex intermediate frequency signal, $(I,Q)^2$, by applying the Hilbert Transform to the second real intermediate frequency (IF) radar echo signal.

4. The method of claim 1 further comprising repeating the steps of claim 1 for a plurality of pairs of first and second azimuthal antenna radar positions to form a two dimensional matrix of a plurality of sequences of a plurality of radial velocity measurements, $Vr_{nm}$, for n=1 to N range delays and from =1 to M−1 total radar azimuthal antenna positions.

5. The method of claim 4 further comprising transforming the two dimensional matrix $Vr_{nm}$ from a range delay-azimuthal antenna radar position coordinate system to a Cartesian coordinate system, $Vr_{ab}$, wherein a and b correspond to Cartesian co-ordinates replacing range delay-azimuthal co-ordinates, for a=1 to N range delays and b=1 to N range delays.

6. The method of claim 5 further comprising repeating all preceding steps for a plurality of antenna radar rotations, to form a three dimensional matrix for the plurality of antenna radar rotations, each having a plurality of sequences of a plurality of radial velocity measurements, $Vr_{abc}$, for a=1 to N range delays, for b=1 to N range delays, and for c=1 to C radar rotations.

7. The method of claim 6 further comprising using a computer processor to extract a plurality of D×D two dimensional sub-matrices to form a three dimensional sub-matrix, $Vr_{DDD}$, from the three dimensional matrix $Vr_{abc}$ for D=1 to 64, based on one or more user selected locations at a user selected location for measurement of interest, within the three dimensional matrix $Vr_{abc}$, one D×D two dimensional matrix for each of D of total of C radar rotations.

8. The method of claim 7 further comprising
using a computer processor to apply a Fourier transform to the three dimensional sub-matrix $Vr_{DDD}$ to form a three dimensional matrix of complex values frequency-wave number spectrum, $V^T r_{DDD}$ for D wave number samples, and for D of C radar rotations.

9. The method of claim 8 further comprising
using a computer processor to generate a three dimensional matrix of power spectrum $|V^T r_{DDD}|^2$, for D wave number samples, and for D of C radar rotations.

10. The method of claim 9 further comprising
using a computer processor to filter the three dimensional matrix of power spectrum $|V^T r_{DDD}|^2$, with an annulus formed fractionally on either side of a radius $K_d$, wherein $K_d$ is a wave number and d is one of 1 to D/2 positive wave frequencies $\Omega_d$, that satisfies a gravity wave dispersion relation for shallow water.

11. The method of claim 10
wherein the computer processor determines a set of three local maximum values in each annulus for each wave frequency, $\Omega_d$, from the step of filtering the three dimensional matrix of power spectrum $|V^T r_{DDD}|^2$, for a plurality of maximum values, one for each wave frequency, $\Omega_d$;
and further comprising using a computer processor to add the plurality of maximum values together to form a quantity $PWR_d$, for each of the plurality of wave frequencies, $\Omega_d$ such that $PWR_d$=SUM(MAX Values of $|V^T r_{DDD}|^2$) over sets in annulus.

12. The method of claim 11 further comprising
using a computer processor to determine a one dimensional matrix of wave height-squared spectral components, $H_d^2 = 4 \ast \text{SUM}(PWR_d / \Omega_d^2)$, constituting a frequency wave-height spectrum, $H_d^2$, for each of $\Omega_d$, frequencies, for d=1 to D wave frequencies, then determining a final singular value of root-mean-squared waveheight $H_{root\ means\ square}$, as follows:)

$$H_{root\ means\ square} = 4 \ast (\text{Sum over all wave frequencies } D \text{ of } H_d^2)^{1/2}.$$

13. The method of claim 12 further comprising
using a computer processor to determine a directional spectrum comprised of the values of $H_d^2$, for d=1 to D wave frequencies, along with the radar azimuthal antenna locations of the largest spectral peaks found in a transformed Cartesian wave number pair, $K_x$–$K_y$, plane for each $\Omega_d$, for d=1 to D wave frequencies.

14. The method of claim 6 further comprising
using a computer processor to extract a plurality of D×D two dimensional sub-matrices to form a three dimensional sub-matrix, $Vr_{DDD}$ from the three dimensional matrix $Vr_{abc}$ for D=1 to 32, based on one or more user selected locations at a user selected location for measurement of interest, within the three dimensional matrix $Vr_{abc}$, one D×D two dimensional matrix for each of D of total of C radar rotations.

\* \* \* \* \*